(12) United States Patent
Park

(10) Patent No.: US 11,917,363 B2
(45) Date of Patent: Feb. 27, 2024

(54) MICROPHONE MODULE PART STRUCTURE OF ARTIFICIAL INTELLIGENCE SMART DEVICE AND ARTIFICIAL INTELLIGENCE SMART DEVICE HAVING THE SAME

(71) Applicant: Yon Mook Park, Seongnam-si (KR)

(72) Inventor: Yon Mook Park, Seongnam-si (KR)

( * ) Notice: Subject to any disclaimer, the term of this patent is extended or adjusted under 35 U.S.C. 154(b) by 184 days.

(21) Appl. No.: 17/621,703

(22) PCT Filed: Jun. 23, 2020

(86) PCT No.: PCT/KR2020/008166
§ 371 (c)(1),
(2) Date: Dec. 22, 2021

(87) PCT Pub. No.: WO2020/262938
PCT Pub. Date: Dec. 30, 2020

(65) Prior Publication Data
US 2022/0248128 A1 Aug. 4, 2022

(30) Foreign Application Priority Data

Jun. 24, 2019 (KR) .................. 10-2019-0074713

(51) Int. Cl.
*H04R 1/34* (2006.01)
*G10L 15/22* (2006.01)
*H04R 1/04* (2006.01)
*H04R 1/08* (2006.01)

(52) U.S. Cl.
CPC .............. *H04R 1/342* (2013.01); *G10L 15/22* (2013.01); *H04R 1/04* (2013.01); *H04R 1/08* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 7,386,109 B2* | 6/2008 | Suzuki | ................... | H04R 27/00 |
| | | | | 379/202.01 |
| 10,349,169 B2* | 7/2019 | Dick | ...................... | H04R 1/265 |
| 10,555,062 B2* | 2/2020 | Ohtsuka | ................ | H04N 23/687 |
| 11,582,544 B2* | 2/2023 | Schuler | .................. | H04R 19/04 |
| 2020/0336813 A1* | 10/2020 | Ushioda | .................... | G06F 1/20 |
| 2022/0377479 A1* | 11/2022 | Stachura | ................. | G10L 15/22 |

FOREIGN PATENT DOCUMENTS

| | | |
|---|---|---|
| KR | 10-2014-0138116 A | 12/2014 |
| KR | 10-2016-0001964 A | 1/2016 |
| KR | 10-2016-0112804 A | 9/2016 |
| KR | 10-2019-0031167 A | 3/2019 |
| KR | 10-2093430 B1 | 3/2020 |

* cited by examiner

*Primary Examiner* — Paul W Huber
(74) *Attorney, Agent, or Firm* — Han's Law Office

(57) ABSTRACT

The present invention relates to a microphone module structure for an artificial intelligence smart device. According to the present invention, internally/externally generated noises, vibrations, impacts, or sounds output from a speaker are prevented from being transmitted to a microphone, whereby the voice recognition rate of an AI speaker, an AI soundbar, or various voice recognition devices can be significantly improved, and thus various smart devices can be effectively controlled via voice.

3 Claims, 17 Drawing Sheets

[Fig. 1]
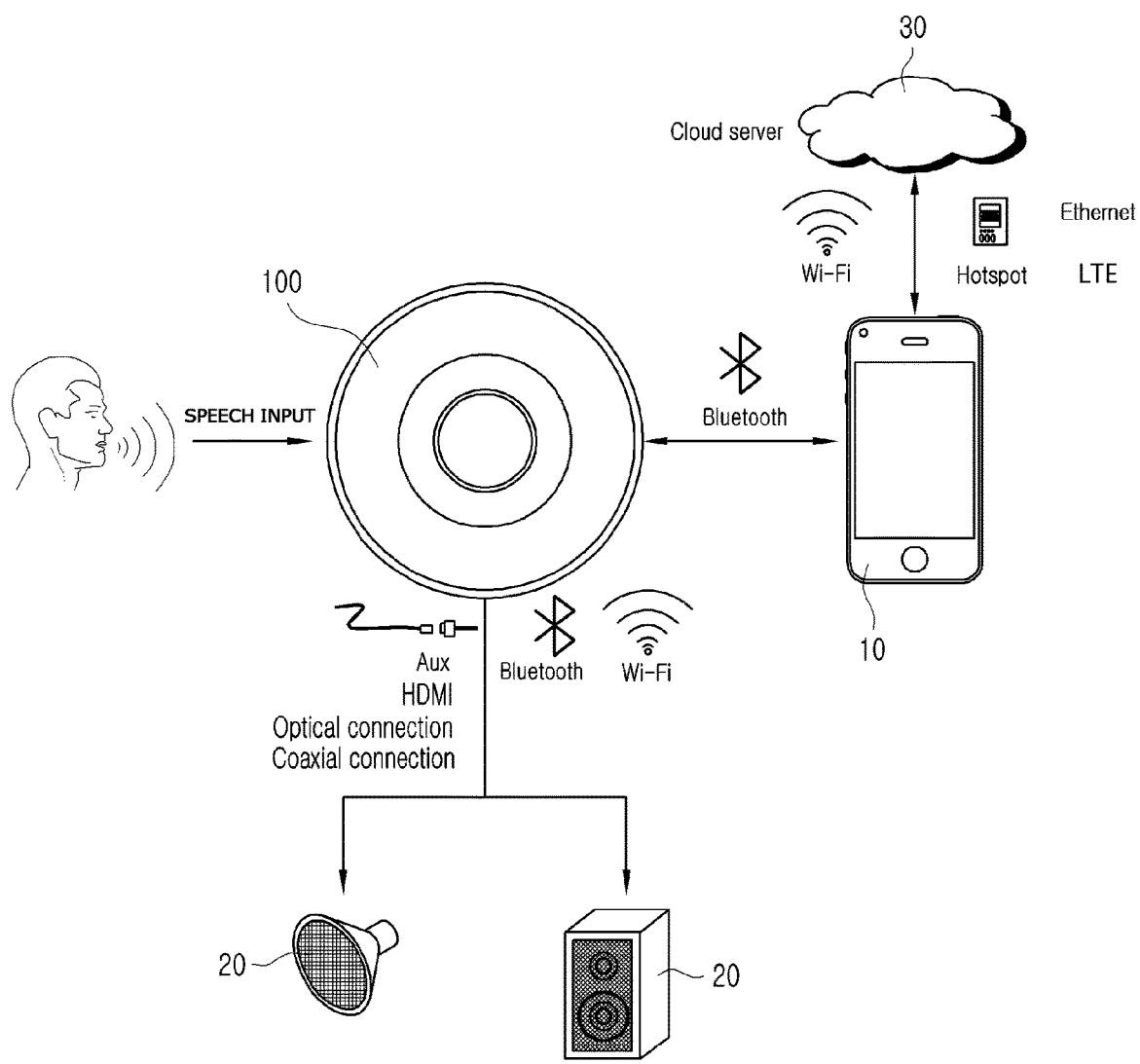

[Fig. 2]
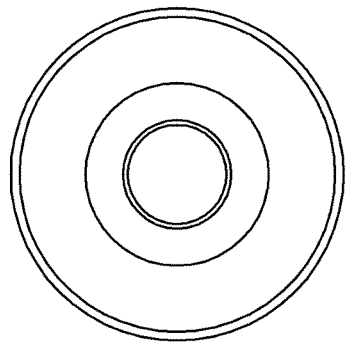
[Fig. 3]
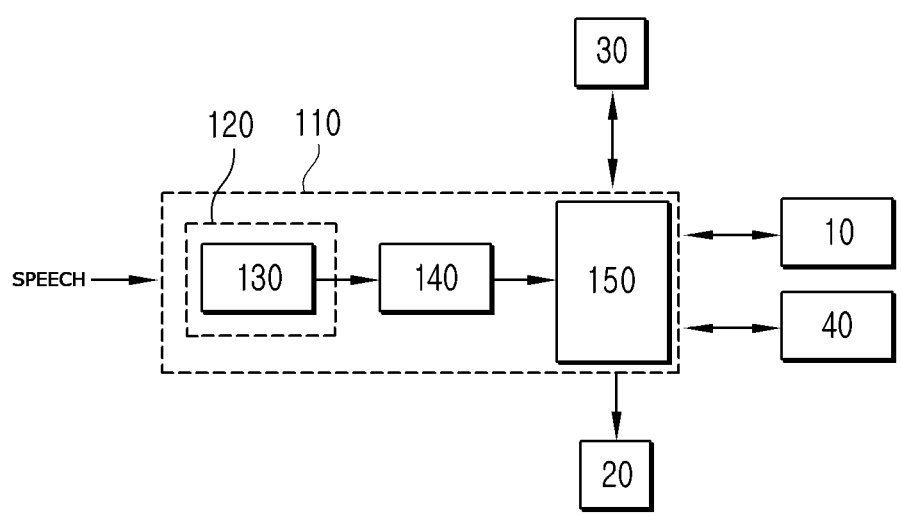

[Fig. 4]
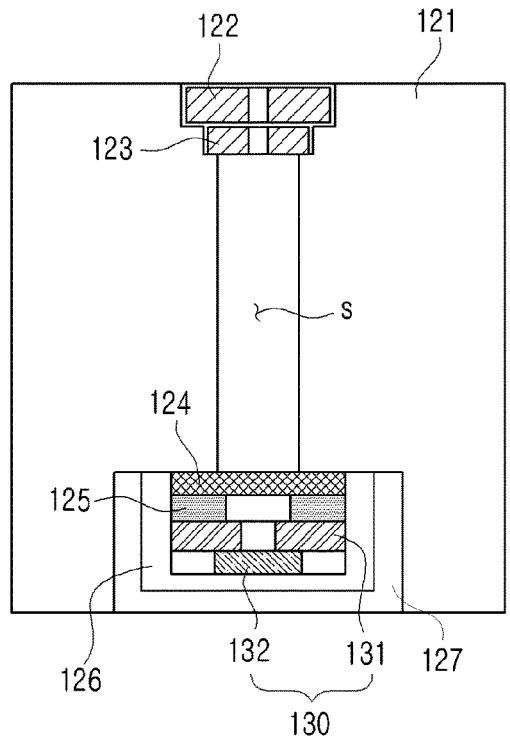
[Fig. 5]
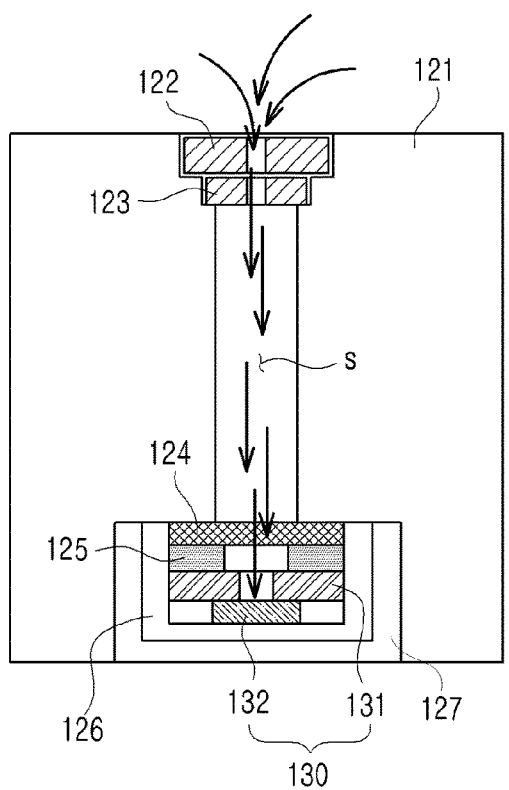

[Fig. 6]
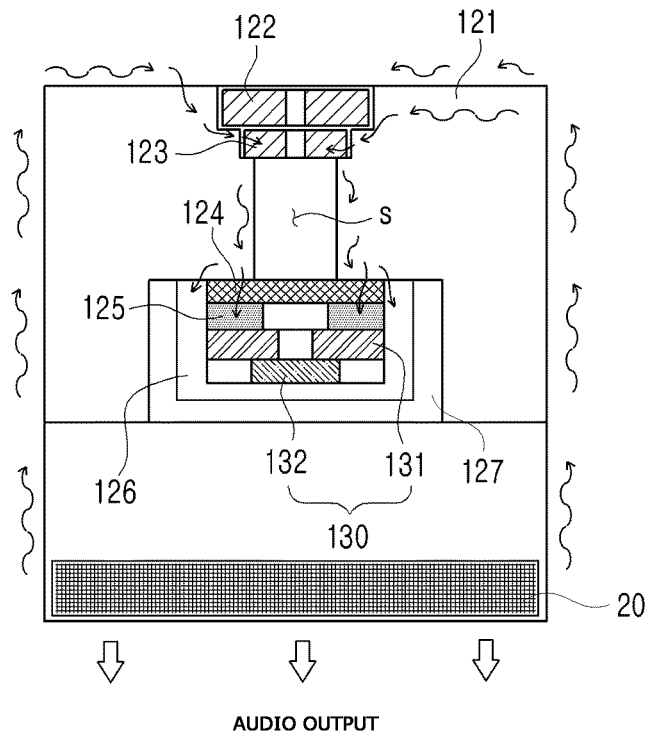
AUDIO OUTPUT
[Fig. 7]
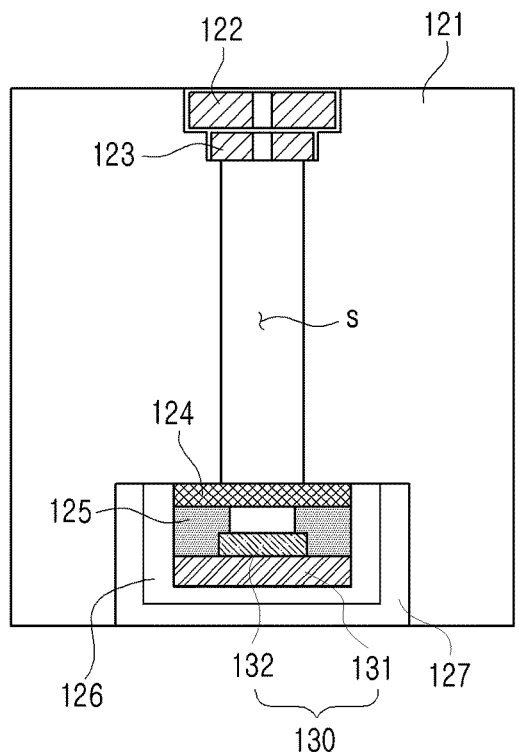

[Fig. 8]
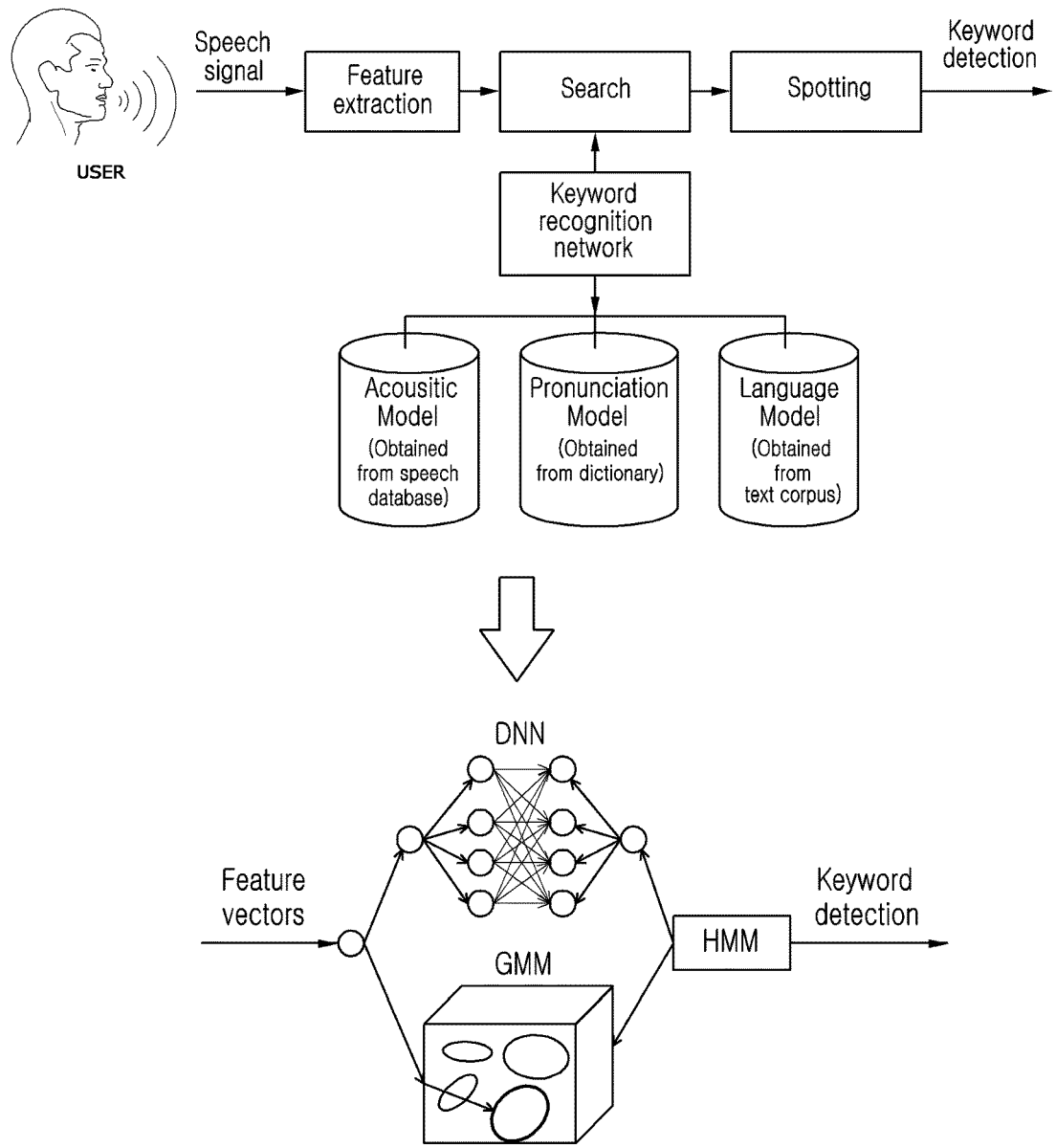

[Fig. 9]
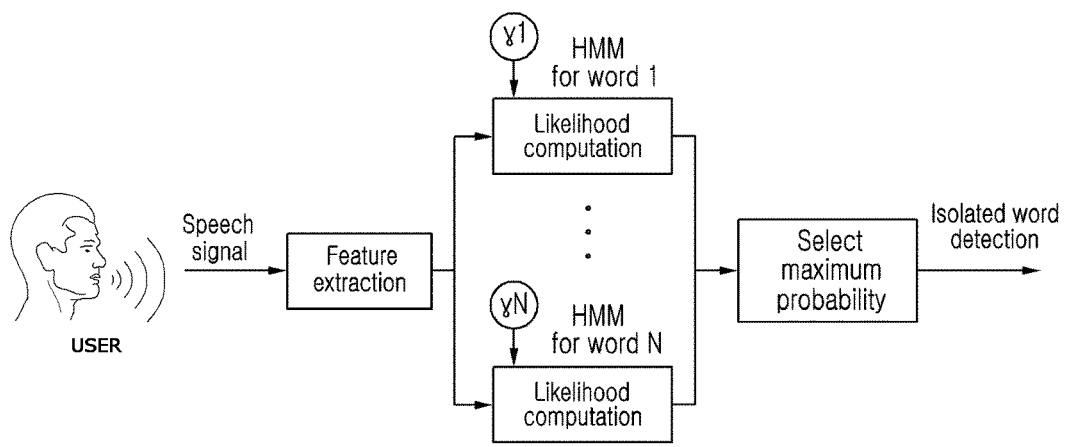
[Fig. 10]
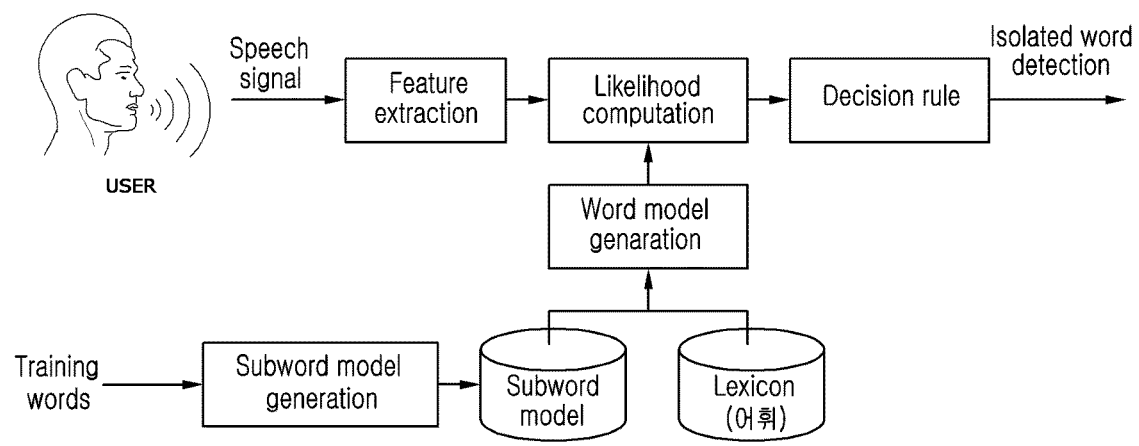

[Fig. 11]
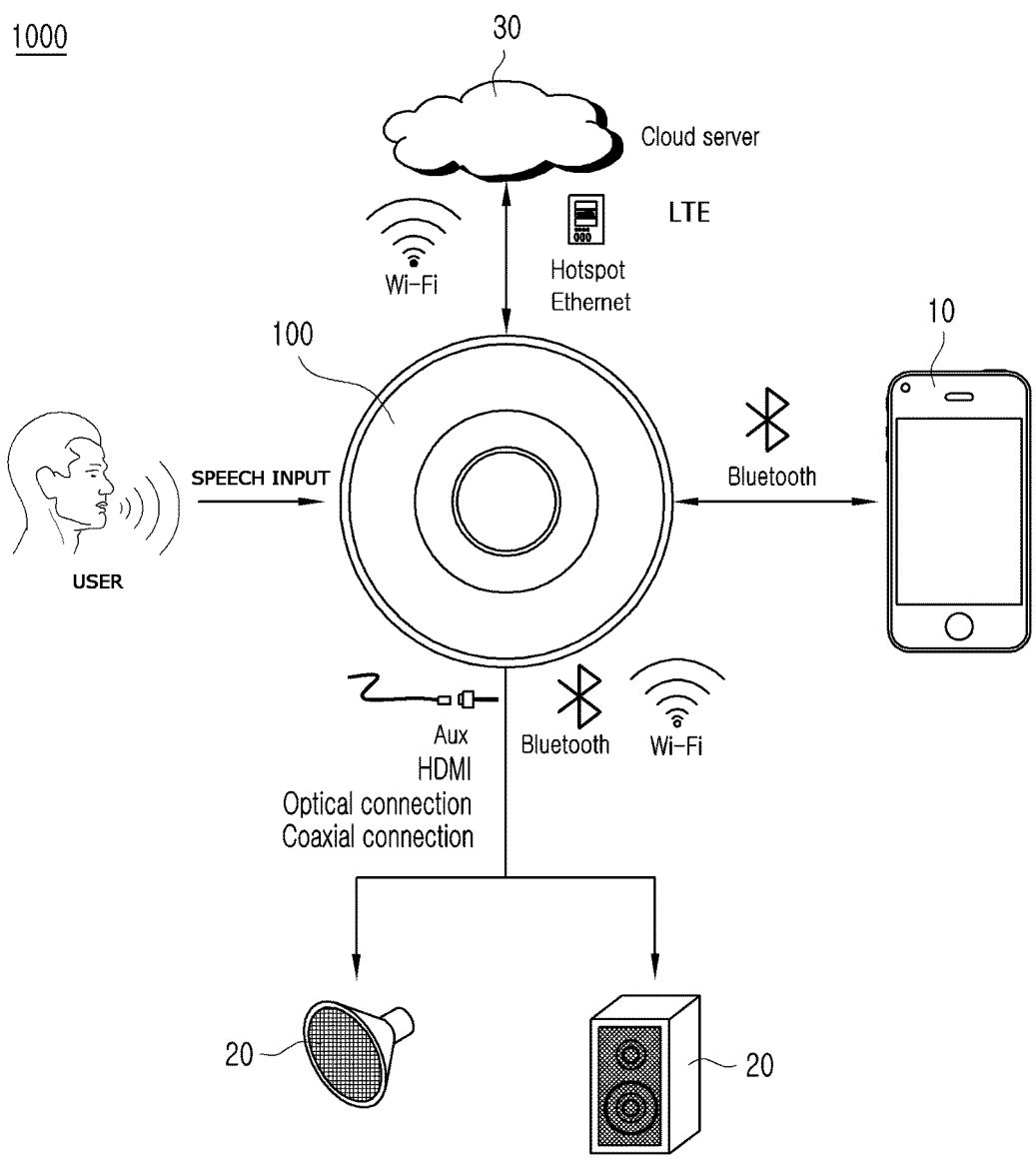

[Fig. 12]
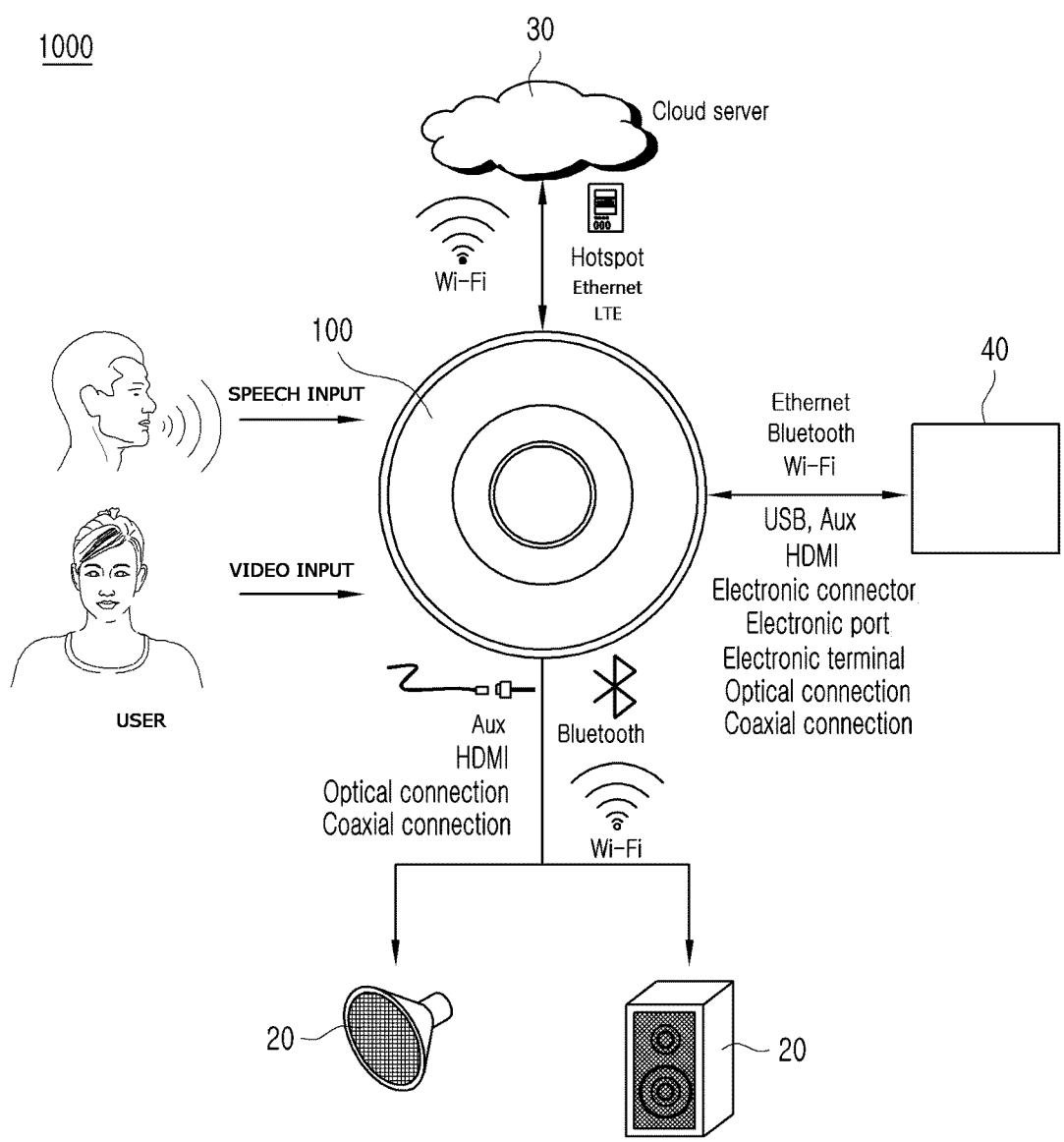

[Fig. 13]
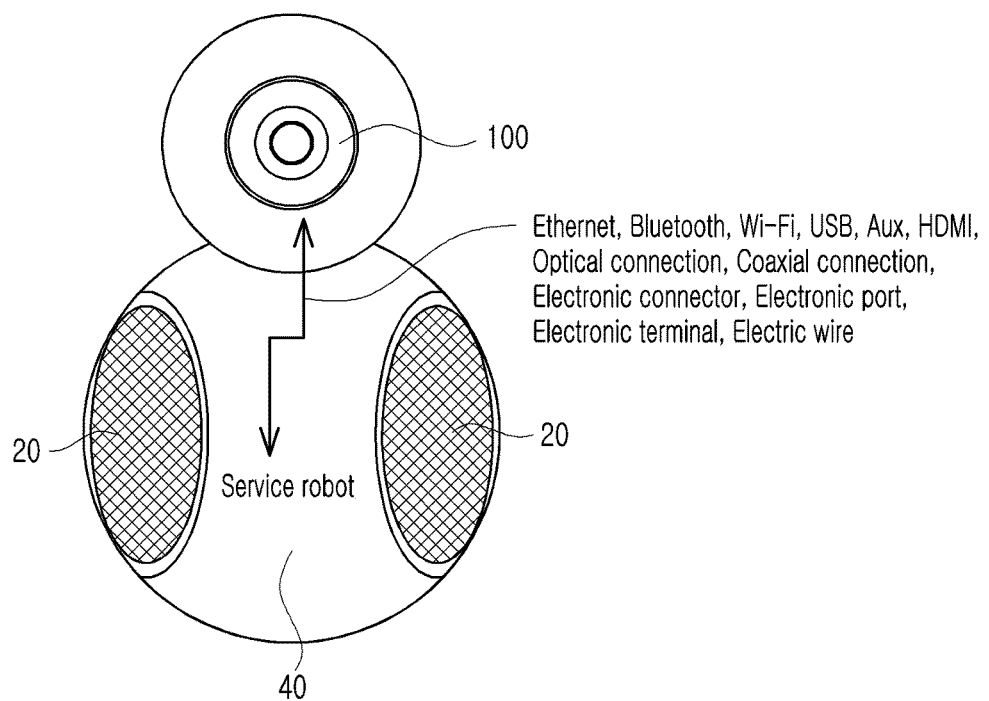

[Fig. 14]
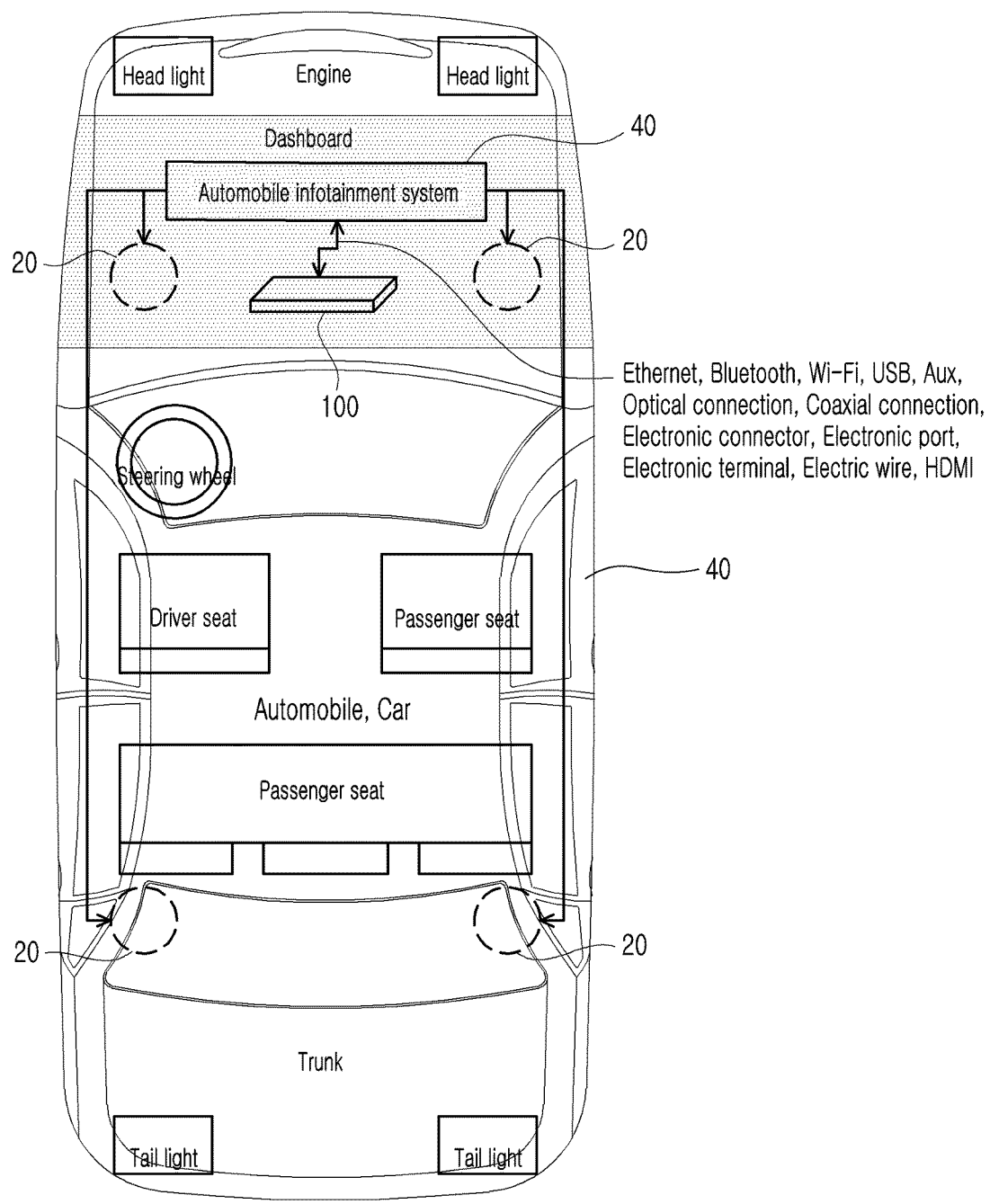

[Fig. 15]
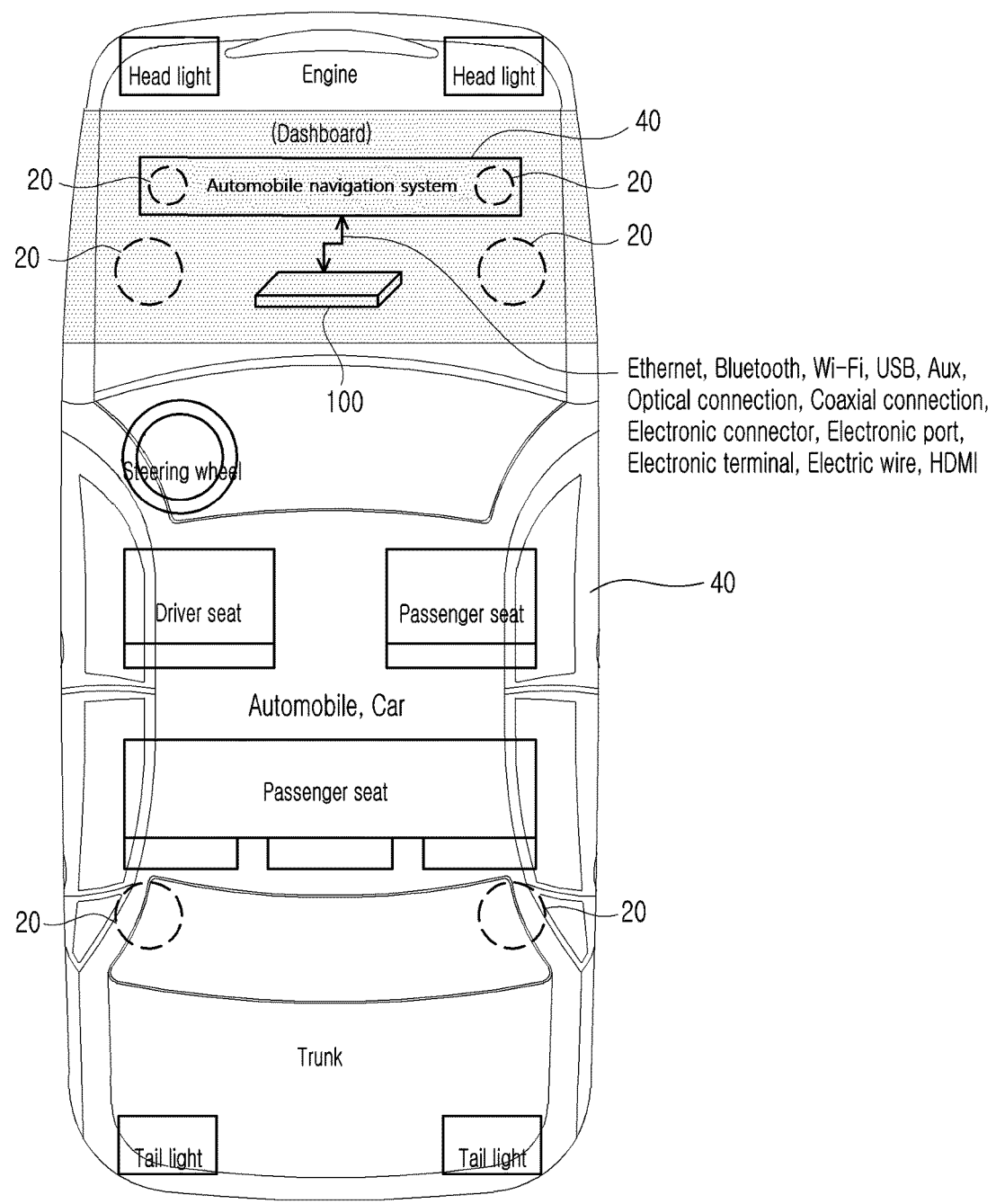

[Fig. 16]
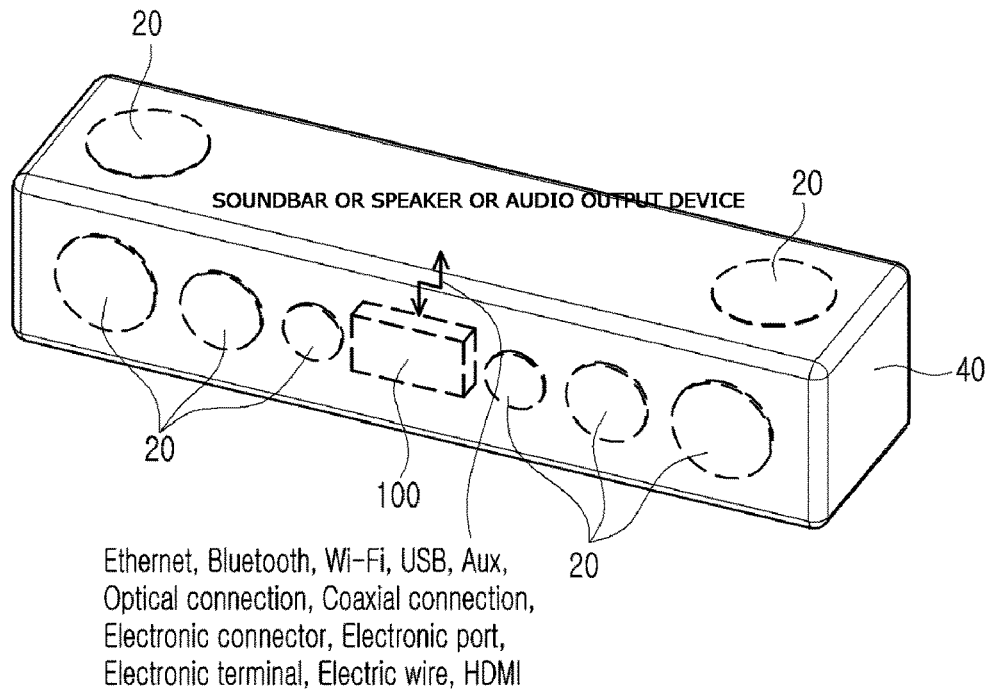
[Fig. 17]
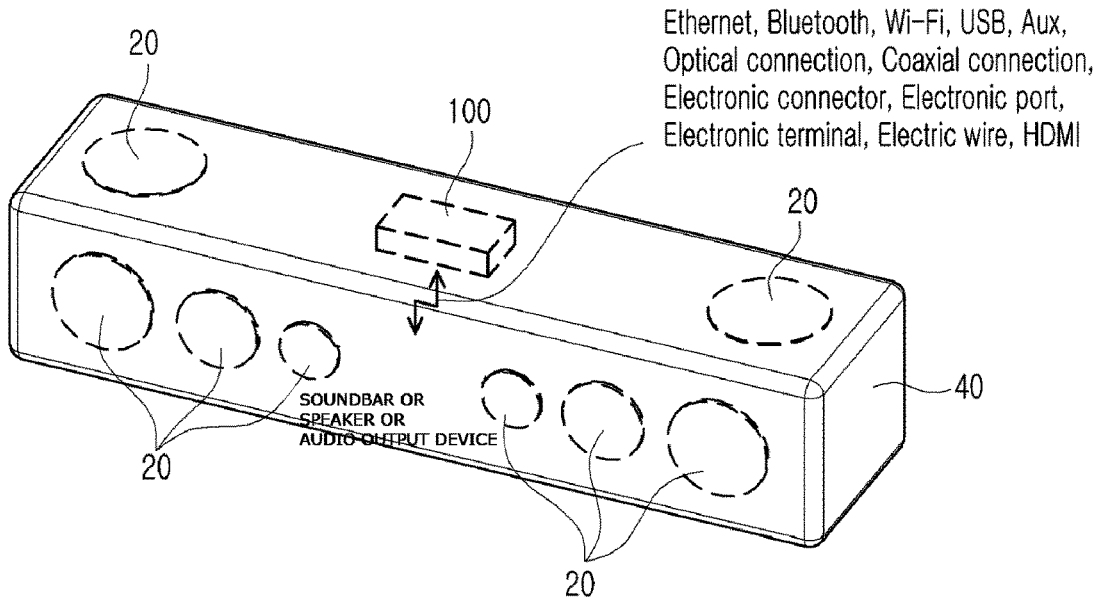

[Fig. 18]
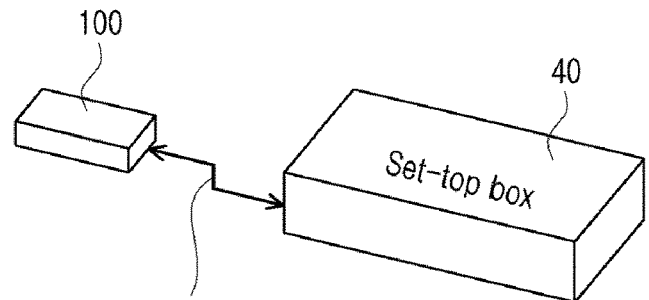
Ethernet, Bluetooth, Wi-Fi, USB, Aux,
Optical connection, Coaxial connection,
Electronic connector, Electronic port,
Electronic terminal, Electric wire, HDMI
[Fig. 19]
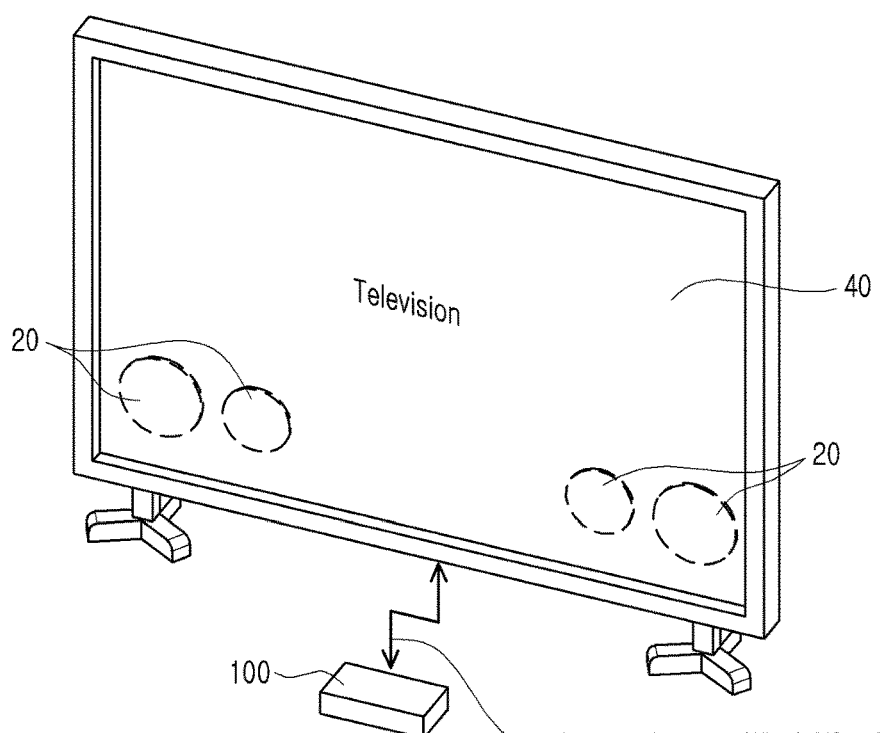
Ethernet, Bluetooth, Wi-Fi, USB, Aux,
Optical connection, Coaxial connection,
Electronic connector, Electronic port,
Electronic terminal, Electric wire, HDMI

[Fig. 20]
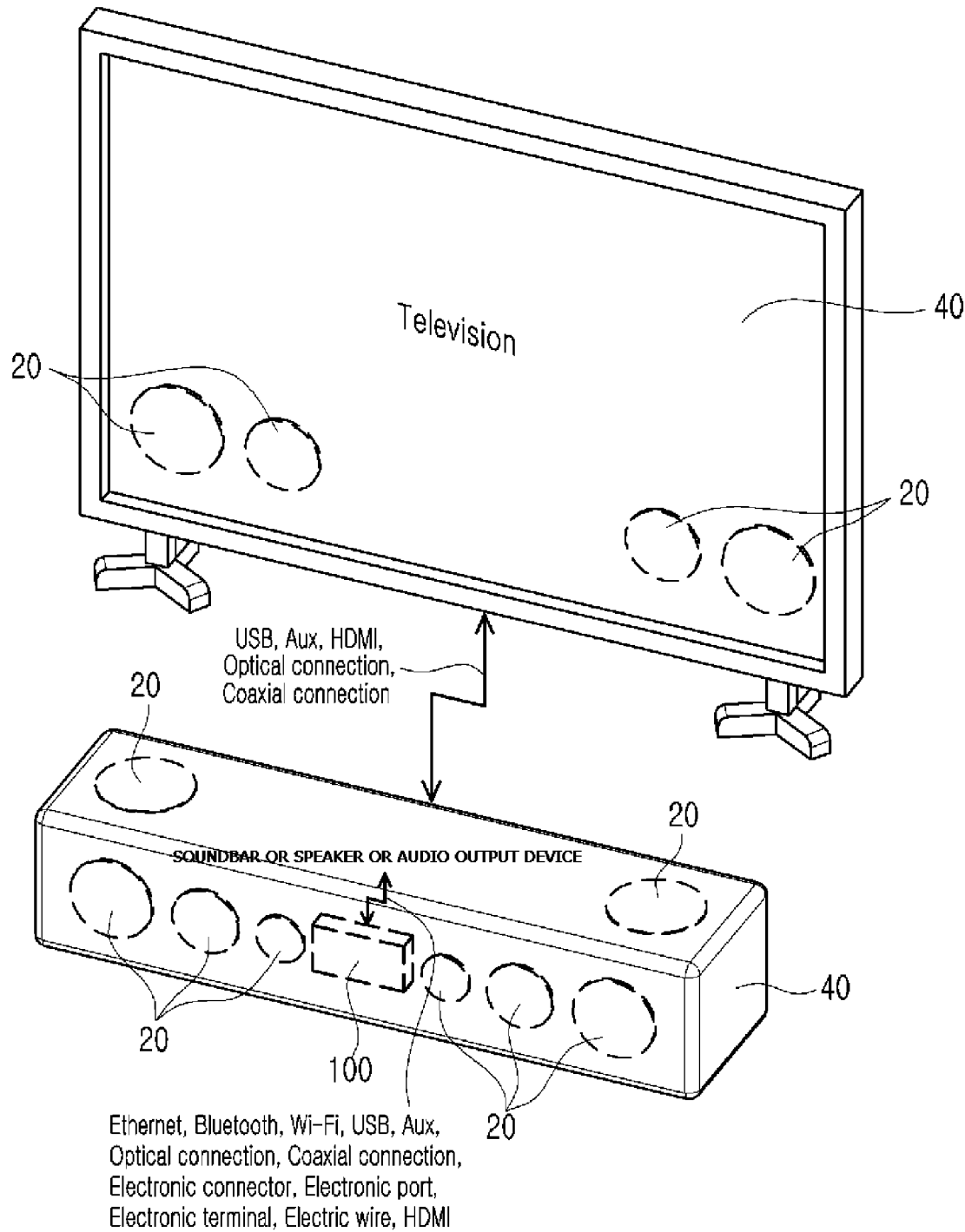

[Fig. 21]
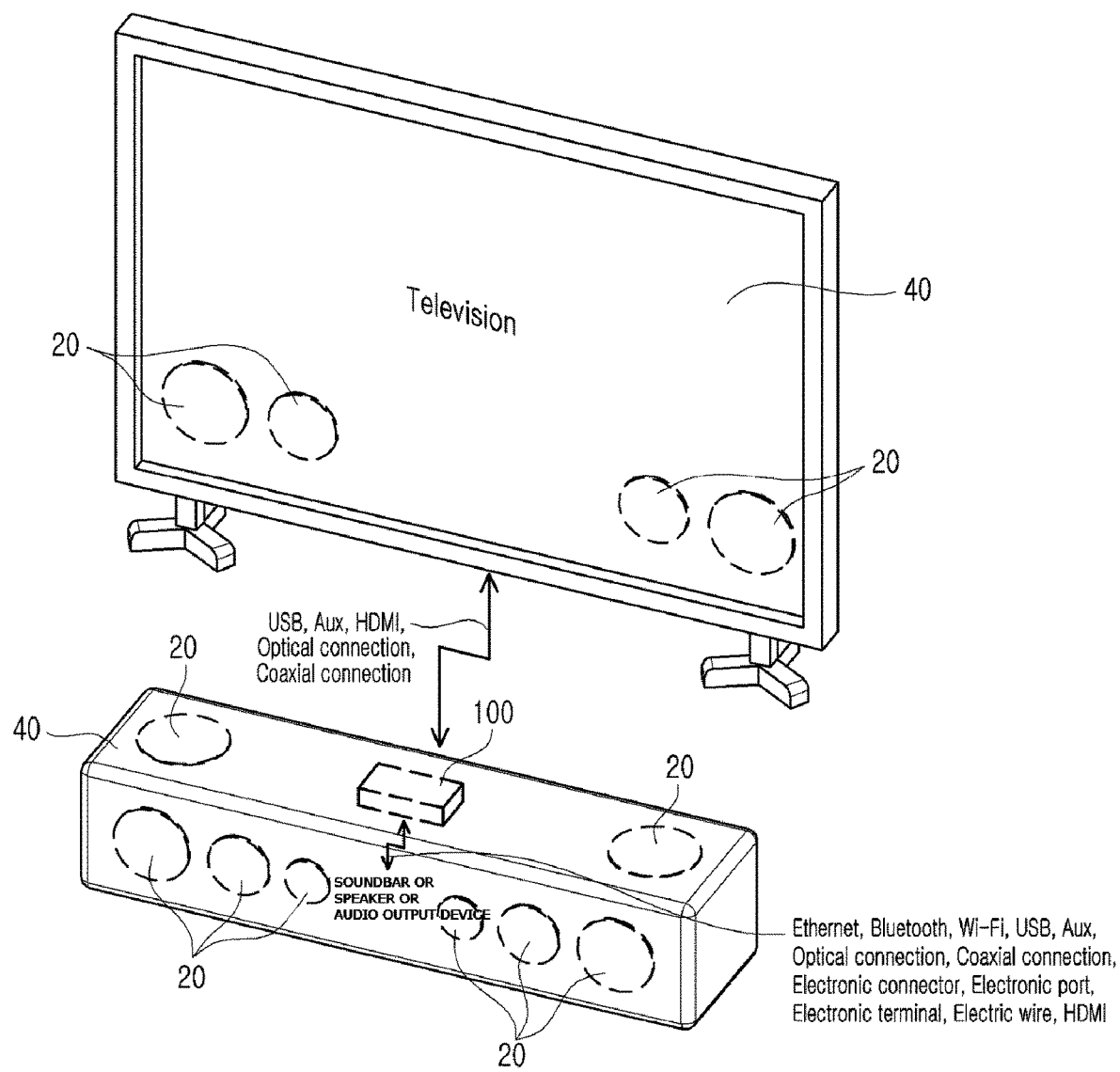

[Fig. 22]
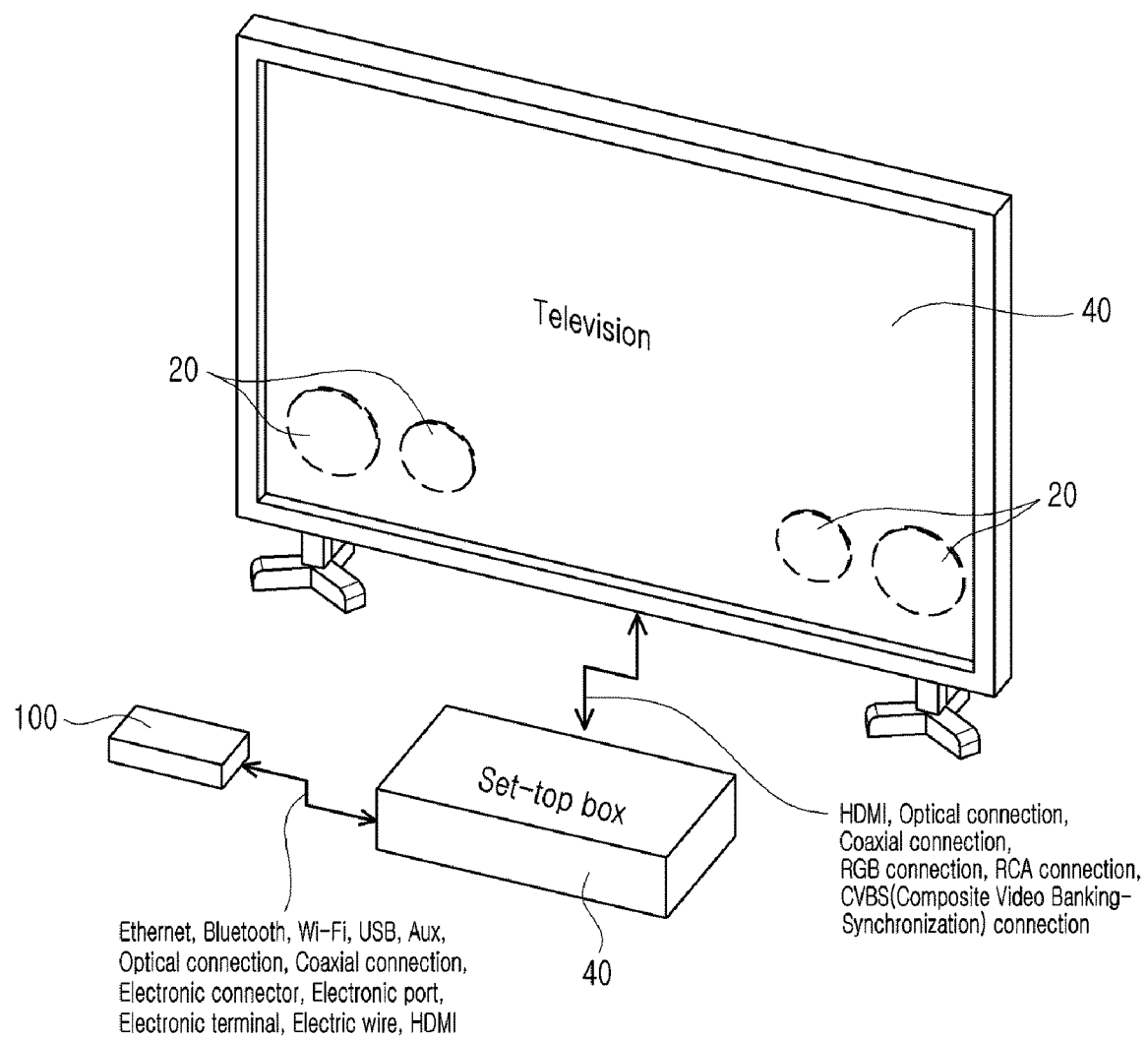

[Fig. 23]
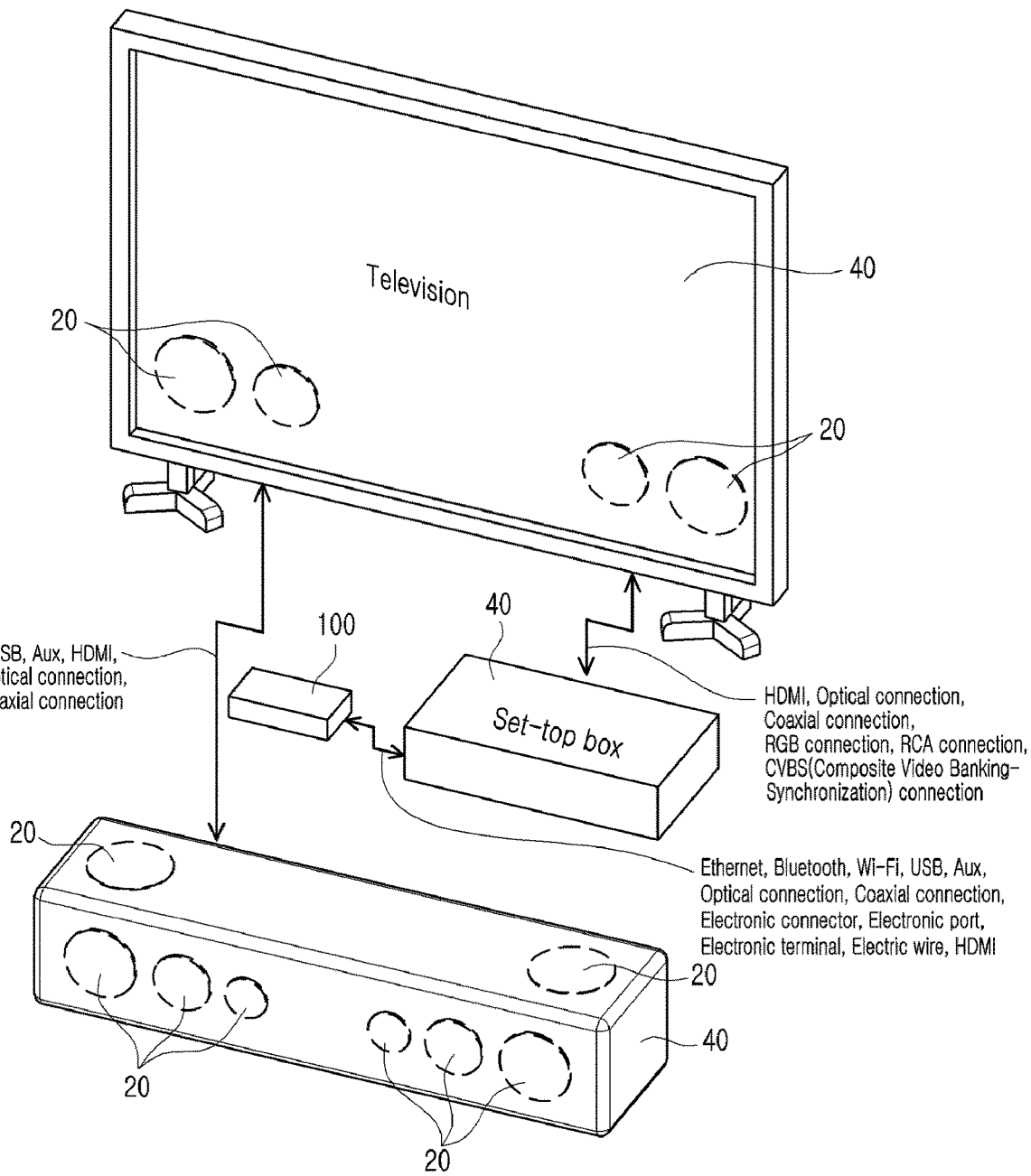

MICROPHONE MODULE PART STRUCTURE OF ARTIFICIAL INTELLIGENCE SMART DEVICE AND ARTIFICIAL INTELLIGENCE SMART DEVICE HAVING THE SAME

1. Field

The present disclosure relates to a microphone module part structure of an artificial intelligence smart device and the artificial intelligence smart device comprising the same, and more particularly, to a microphone module part structure of an artificial intelligence smart device, that can block internal and external noise, vibration, shock or sound output from a speaker from being transmitted to the microphone, thereby significantly improving the speech recognition rate, and the artificial intelligence smart device comprising the same.

2. Background

Recently, electronic devices such as smart phones and tablet PCs, desktop PCs, portable multimedia players (PMPs), MP3 players, and wearable devices are being widely distributed to users, and the users can use these various electronic devices to access a variety of contents.

Especially, recently, a speaker capable of speech recognition called Artificial Intelligence (AI) speaker has been developed, and a sound bar capable of speech recognition called Artificial Intelligence (AI) sound bar has been developed. The AI speaker and AI sound bar as described above can not only play music or images by recognizing a user's speech, but can also provide various information to the user, and perform various functions of controlling wirelessly connected external devices according to speech.

However, in the AI speaker and AI soundbar as described above, since the microphone that receives speech is integrated together with the speaker that outputs audio, when the user is far away from the AI speaker and AI soundbar and audio is being output from the speaker, there occurs a problem where the speech reception rate from the microphone significantly decreases.

Further, besides the audio output of the speaker as described above, conventional AI speakers and AI soundbars have another problem that the speech reception rate of the microphone significantly decreases due to other various internal and external noise, vibrations and shocks.

SUMMARY

Therefore, a purpose of the present disclosure is to resolve the problems of prior art, that is, to provide a microphone module part structure of an artificial intelligence smart device, that can block internal and external noise, vibration, shock or sound output from a speaker from being transmitted to the microphone, thereby significantly improving the speech recognition rate, and the artificial intelligence smart device comprising the same.

According to the present disclosure, the abovementioned purpose is achieved by a microphone module part structure of an artificial intelligence smart device including a case part, a microphone module part installed in the case part, a microphone part installed in the microphone module part and receives speech from outside, a recognition part installed in the case part and recognizes the speech received in the microphone part to generate a control command, and a control part installed in the case part and transmits the control command to the terminal such that the terminal can operate and transmits data to a speaker such that audio output can be performed in the speaker, wherein the microphone module part forms a concentration space that is a space where speech is to be concentrated, and the microphone part is installed on the concentration space to prevent the audio output that is output from the speaker from being transmitted to the microphone part.

According to the present disclosure, the abovementioned purpose is achieved by an artificial intelligence smart device including a case part; a microphone module part installed in the case part; a microphone part installed in the microphone module part, and receives speech from outside; a recognition part installed in the case part, and recognizes the speech received in the microphone part to generate a control command; and a control part installed in the case part, and transmits the control command to the terminal such that the terminal can operate, and transmits data to a speaker such that audio output can be performed in the speaker, wherein the microphone module part forms a concentration space that is a space where speech is to be concentrated, and the microphone part is installed on the concentration space to prevent the audio output that is output from the speaker from being transmitted to the microphone part.

Further, the microphone module part may include a base part where the concentration space is formed, and an elasticity part made of an elastic material or acoustic absorbent material or vibration proof material or composite material to prevent sound or vibration or shock caused in the speaker from being transmitted to the microphone part, and installed at the concentration space side.

Further, the microphone module part may further include a first sealing part that finishes an upper surface of the concentration space, and a mesh part that is made of a mesh material and installed on one or more of an upper side or lower side of the concentration space.

Further, the elasticity part may include a first elasticity part installed on the upper side of the concentration space and fixated on the base part by the first sealing part, a second elasticity part installed on an upper side of the microphone part, and a third elasticity part installed on a lower surface of the concentration space and installed on the microphone module part such that the second elasticity part and the microphone part can be accommodated.

Further, the microphone module part may further include a second sealing part installed on a lower side of the microphone module part as if surrounding the third elasticity part to fixate the third elasticity part to the microphone module part.

According to the present disclosure, the speech recognition rate of an AI speaker, AI soundbar or various speech recognition devices can be significantly improved, thereby enabling various smart devices to be effectively controlled through speech.

BRIEF DESCRIPTION OF THE DRAWINGS

FIG. 1 is an overall illustration of a speech control system using an artificial intelligence smart device according to one embodiment of the present disclosure;

FIG. 2 is an illustration of the outer appearance of the artificial intelligence smart device according to one embodiment of the present disclosure;

FIG. 3 is an illustration of electrical connection of components of the artificial intelligence smart device according to one embodiment of the present disclosure;

FIG. 4 is an illustration of the structure of a microphone module part of the artificial intelligence smart device according to one embodiment of the present disclosure;

FIG. 5 is an illustration of a process in which speech is being transmitted to the microphone part of the artificial intelligence smart device according to one embodiment of the present disclosure;

FIG. 6 is an illustration of a process in which noise, vibration, shock are being absorbed and blocked in the microphone module part of the artificial intelligence smart device according to one embodiment of the present disclosure;

FIG. 7 is an illustration of a modified example of the structure of the microphone part and microphone module part of the artificial intelligence smart device according to one embodiment of the present disclosure;

FIG. 8 is an illustration of a process in which keyword speech recognition is being performed in a recognition part of the artificial intelligence smart device according to one embodiment of the present disclosure;

FIGS. 9 and 10 are illustrations of a process in which isolated word speech recognition is being performed in the recognition part of the artificial intelligence smart device according to one embodiment of the present disclosure;

FIG. 11 is an overall illustration of a speech control system using the artificial intelligence smart device according to one embodiment of the present disclosure;

FIG. 12 is an overall illustration of the speech control system using the artificial intelligence smart device according to a first modified example of the present disclosure;

FIG. 13 is an overall illustration of the speech control system using the artificial intelligence smart device according to a second modified example of the present disclosure; and FIGS. 14 to 23 are overall illustrations of the speech control system using the artificial intelligence smart device according to other additional modified examples of the present disclosure.

DETAILED DESCRIPTION

Hereinbelow, embodiments of the present disclosure will be described in detail with reference to the drawings. In adding reference numerals to the components of each drawing, it should be noted that the same components are given the same reference numerals as much as possible even when they are indicated on different drawings.

Further, in describing the embodiments of the present disclosure, if it is determined that a detailed description of a related known configuration or function interferes with the understanding of the embodiment of the present disclosure, the detailed description thereof will be omitted.

In addition, in describing the components of the embodiments of the present disclosure, terms such as first, second, A, B, (a), (b) and the like may be used. These terms are used to merely distinguish those components from other components, and they do not limit the essence, sequence or order of the corresponding components.

From now, referring to the attached drawings, the artificial intelligence smart device according to one embodiment of the present disclosure will be described in detail.

FIG. 1 is an overall illustration of a speech control system using an artificial intelligence smart device according to one embodiment of the present disclosure, FIG. 2 is an illustration of the appearance of the artificial intelligence smart device according to one embodiment of the present disclosure, FIG. 3 is an illustration of electrical connection of components of the artificial intelligence smart device according to one embodiment of the present disclosure, FIG. 4 is an illustration of the structure of a microphone module part of the artificial intelligence smart device according to one embodiment of the present disclosure, FIG. 5 is an illustration of a process in which speech is being transmitted to the microphone part of the artificial intelligence smart device according to one embodiment of the present disclosure, FIG. 6 is an illustration of a process in which noise, vibration and shock are being absorbed and blocked in the microphone module part of the artificial intelligence smart device according to one embodiment of the present disclosure, FIG. 7 is an illustration of a modified example of the structure of the microphone part and microphone module part of the artificial intelligence smart device according to one embodiment of the present disclosure, FIG. 8 is an illustration of a process in which keyword speech recognition is being performed in a recognition part of the artificial intelligence smart device according to one embodiment of the present disclosure, and FIGS. 9 and 10 are illustrations of a process in which isolated word speech recognition is being performed in the recognition part of the artificial intelligence smart device according to one embodiment of the present disclosure.

As illustrated in FIGS. 1 to 3, the artificial intelligence smart device according to one embodiment of the present disclosure includes a case part 110, a microphone module part 120, a microphone part 130, a recognition part 140 and a control part 150.

The case part 110 provides a space where the microphone module part 120, recognition part 140 and control part 150, that will be described later on, may be installed. The case part 110 has, on its rear surface or side surface or front surface, an installation means having a mechanical device form for enabling fixation or connection, such as a clip, hook, screw, bolt, nut and the like, or an installation means having an electronic device form or electrical device form, enabling fixation or connection, such as a Universal Serial Bus (USB) port, Auxiliary port, High-Definition Multimedia Interface (HDMI) port, optical connector, coaxial connector, various electronic connectors, various electronic ports/electronic terminals, various electric wires and the like, such that it can be easily installed on a general speaker, general soundbar, AI speaker, AI soundbar, Wi-Fi speaker, Bluetooth speaker, television, set-top box, refrigerator, air cleaner/air purifier, air conditioner, washing machine/washer, microwave/microoven, smart phone, smart watch, smart glass, helmet, wearable devices for human or animal or things, Internet of Things (IoT) devices, head mounted display devices for virtual reality, earphone/earset wearable on ear, headphone/headset wearable on head, neckband/neckset/neckphone wearable on neck, wristband/wristset/wristphone wearable on wrist, notebook personal computer, tablet personal computer, desktop personal computer, electronic book (e-book), monitor, industrial robot, service robot, teaching robot, toy robot, rehabilitation robot, humanoid robot, kiosk, semiconductors manufacturing equipments and metrology equipments and inspection equipments, display panel manufacturing equipments and metrology equipments and inspection equipments, PCB boards manufacturing equipments and metrology equipments and inspection equipments, various products manufacturing equipments and metrology equipments and inspection equipments, various device manufacturing equipments and metrology equipments and inspection equipments, automobile, train, subway, ship/boat, submarine, airplane/aircraft, drone, space shuttle/spacecraft/ spaceship, space station, building inner wall, ceiling, desk, other structures, other electronic products, other home appliances and the like.

The shape of such a case part 110 may be provided in a button shape, stud shape, pin shape, bar shape, dish/plate/pan shape, bowl shape, pot shape, hexahedron shape, cube shape, rectangular parallelepiped/parallelopipedon shape, cylinder shape, cone shape, circle/round shape, sphere/conglobation/globoid shape, polyhedron shape and the like, but there is no limitation thereof, and thus may be provided in any form as long as it provides the space where the microphone module part 120, recognition part 140 and control part 150 may be installed.

The microphone module part 120 is installed in the case part 110 described above. The microphone module part 120 provides therein the space in which the microphone part 130, that will be described later on, may be installed, and blocks internal and external noise, vibration, shock from being transmitted to the microphone part 130.

In more detail, the microphone module part 120 described above may include a base part 121, first sealing part 122, first elasticity part 123, mesh part 124, second elasticity part 125, third elasticity part 126 and second sealing part 127.

As illustrated in FIGS. 4 to 7, the base part 121 is where a concentration space S is formed, that is, a space where the microphone part 130 that will be described later on, may be installed. The base part 121 provides a space where the first sealing part 122, first elasticity part 123, mesh part 124, second elasticity part 125, third elasticity part 126 and second sealing part 127, may be installed. According to such a structure of the base part 121, after external speech is concentrated on the concentration space S, it may be input into the microphone part 130. According to the concentration space S described above, since the speech reception rate in the microphone part 130 is significantly improved, even if the microphone module part 120 is disposed at a position that is more than several meters (e.g., 1 m) away from the user who made the speech, the speech can be effectively collected in the microphone part 130.

The first sealing part 122 finishes an upper side of the concentration space S, and fixates the first elasticity part 123, that will be described later on, such that the first elasticity part 123 does not vibrate or move due to the internal and external noise, vibration, shock or the sound of the speaker 20 installed inside or outside of the microphone module part 120.

The first elasticity part 123 primarily absorbs and blocks the noise, vibration, shock caused from inside and outside of the artificial intelligence smart device 100 according to one embodiment of the present disclosure flowing into the concentration space S, seals the concentration space S from the noise caused from inside and outside of the artificial intelligence smart device 100 according to one embodiment of the present disclosure flowing into the concentration space S, and primarily seals the microphone part 130 from the noise caused from inside and outside of the artificial intelligence smart device 100 according to one embodiment of the present disclosure flowing into the concentration space S, and the first elasticity part 123 may be made of an elastic material or acoustic absorbent material, or vibration proof material or composite material such as silicon, rubber, cushion, sponge, phorone, ethylene-vinyl acetate, cork, tree, wood, pulp, various composite materials, various elastic materials, various acoustic absorbent materials, sound absorbent materials, various vibration proof materials and the like.

Such a first elasticity part 123 is installed above the concentration space S, and is fixedly installed on the base part 121 by the first sealing part 122 described above.

The mesh part 124 is made of a mesh material to block external dust, foreign matter and the like from flowing into the microphone part 130, and may be installed above or below the concentration space S.

The second elasticity part 125 secondarily absorbs and blocks the noise, vibration, shock caused from inside and outside of the artificial intelligence smart device 100 according to one embodiment of the present disclosure flowing into the concentration space S, secondarily seals the microphone part 130 from the noise caused from inside and outside of the artificial intelligence smart device 100 according to one embodiment of the present disclosure flowing into the concentration space S, and secondarily seals the microphone part 130 from the noise caused from inside and outside of the artificial intelligence smart device 100 according to one embodiment of the present disclosure and flowing into the microphone part 130 through the second sealing part 127 that will be described later on, and the second elasticity part 125 may be made of an elastic material or acoustic absorbent material, or vibration proof material or composite material such as silicon, rubber, cushion, sponge, phorone, ethylene-vinyl acetate, cork, tree, wood, pulp, various composite materials, various elastic materials, various acoustic absorbent materials, sound absorbent materials, various vibration proof materials and the like. It is desirable that such a second elasticity part 125 is installed on an upper side of the microphone part 130.

The third elasticity part 126 tertiarily absorbs and blocks the noise, vibration, shock caused from inside and outside of the artificial intelligence smart device 100 according to one embodiment of the present disclosure flowing into the microphone part 130 through the second sealing part 127 that will be described later on, and tertiarily seals the microphone part 130 from the noise caused from inside and outside of the artificial intelligence smart device 100 according to one embodiment of the present disclosure flowing into the microphone part 130 through the second sealing part 127 that will be described later on, and the third elasticity part 126 may be made of an elastic material or acoustic absorbent material, or vibration proof material or composite material such as silicon, rubber, cushion, sponge, phorone, ethylene-vinyl acetate, cork, tree, wood, pulp, various composite materials, various elastic materials, various acoustic absorbent materials, sound absorbent materials, various vibration proof materials and the like. Such a third elasticity part 126 forms an accommodation space where the microphone part 130 may be accommodated, and may be installed fixedly on the base part 121 by the second sealing part 127 that will be described later on.

The second sealing part 127 fixates the third elasticity part 126 such that the third elasticity part 126 does not vibrate or move due to the internal and external noise, vibration, shock, or the sound of the speaker 20 installed inside or outside of the microphone module part 120, and the second sealing part 127 is installed on a lower side surface of the microphone module part 120 as if surrounding the third elasticity part 126.

According to the aforementioned structure of the microphone module part 120 that includes the base part 121, first sealing part 122, first elasticity part 123, mesh part 124, second elasticity part 125, third elasticity part 126 and second sealing part 127, the internal and external noise, shock, vibration flowing into the microphone part 130 through the concentration space S and the second sealing part 127, and the noise, shock, vibration caused by the speaker 20 installed inside or outside of the microphone module part 120 are effectively absorbed and blocked, and the internal and external noise, shock, vibration flowing into the microphone part 130 through the concentration space S and the second sealing part 127 and the noise, shock, vibration caused by the speaker 20 installed inside or outside of the microphone module part 120 can be sealed from the microphone part 130, and thus the speech recognition rate in the microphone part 130 can be significantly improved.

When a sound output means, that is, a speaker 20 is mounted onto the microphone module part 120 as illustrated in FIG. 6, the installation structure of the microphone part 130 described above can effectively resolve the problem where the sound, vibration, shock flowing into the concentration space S through the microphone module part 120 by the audio output of the speaker 20 is transmitted to the microphone part 130 to cause noise and the problem of decreasing the speech recognition rate, and even when an additional speaker 20 is not mounted onto the microphone module part 120, the installation structure of the microphone part 130 described above can effectively resolve the problem where the noise, vibration, shock flowing into the concentration space S due to external noise, vibration, shock is transmitted to the microphone part 130 to cause noise, and the problem of decreasing the speech recognition rate.

Meanwhile, although not illustrated in the drawings, in the microphone module part 120, a battery part for supplying power to the microphone part 130, recognition part 140 and control part 150, may be installed. Such a battery part may be provided as a chargeable and dischargeable lithium polymer battery or lithium-ion battery and the like, but there is no limitation thereto. Meanwhile, the battery part may be equipped with an overcharge prevention circuit that blocks charging when overcharged.

Further, although not illustrated in the drawings, a display device for displaying the state of the recognition part 140 and control part 150, that will be described later on, may be installed outside of the microphone module part 120. The display device may be provided in an LED matrix type, but there is no limitation thereto, and thus it may be provided in any form as long as it can display the state of the recognition part 140 and the control part 150.

Further, although not illustrated in the drawings, a camera module for photographing images and generating image information, may be installed outside of the microphone module part 120, and a wireless communication module for Bluetooth communication, Wi-Fi communication, Long Term Evolution (LTE) communication and the like with an external device, may be installed inside the microphone module part 120.

Further, although not illustrated in the drawings, an energy harvesting layer for absorbing electromagnetics to generate electrical energy may be applied on an outer surface of the microphone module part 120. Such an energy harvesting layer may be connected to the battery part described above to absorb the electromagnetics near the microphone module part 120, and convert the electromagnetics into electrical energy and charge the battery part.

Further, although not illustrated in the drawings, a solar battery panel for absorbing light energy near the microphone module part 120 to produce electrical energy may be installed in the microphone module part 120. Such a solar battery panel may be connected to the battery part described above and absorb the light near the microphone module part 120 and convert the light into electrical energy and charge the battery part.

The microphone part 130 receives speech from outside. The microphone part 130 is installed on the concentration space S formed in the base part 121 described above, and is electrically connected to the recognition part 140 that will be described later on. The speech received by the microphone part 130 is transmitted to the recognition part 140 that will be described later on, so that speech recognition may be performed.

Meanwhile, the microphone part 130 described above may be equipped with acoustic signal amplification function, acoustic signal filtering function, acoustic voice signal extraction function, acoustic noise signal extraction function, acoustic source separation function, acoustic echo cancellation function, acoustic noise reduction function, acoustic beam forming function and the like. According to the microphone part 130 equipped with such functions, the speech reception rate can be further improved.

Meanwhile, in more detail, the microphone part 130 may include a substrate part 131 and a microphone 132. The substrate part 131 is equipped with the microphone 132, and the substrate part 131 processes speech information being input into the microphone 132 and transmits the processed speech information to the recognition part 140 that will be described later on. On one side of the substrate part 131 equipped with the microphone 132, a penetration hole may be formed such that speech can flow from the concentration space S to the microphone 132. The microphone 132 receives speech transmitted from outside, and the microphone 132 is installed on the substrate described above. Such a microphone 132 may be provided as any one or more of a carbon microphone, ribbon microphone, moving coil microphone, crystal microphone, dynamic microphone, condenser microphone, electrostatic microphone, velocity microphone, Electric Capacitor Microphone (ECM), analog micro-electro mechanical systems microphone, digital micro-electro mechanical systems microphone and the like.

The recognition part 140 recognizes the speech received from the microphone part 130 described above, and generates a control command. The recognition part 140 is installed in the microphone module part 120 or the case part 110, and is electrically connected to the microphone part 130 described above and to the control part 150.

The recognition part 140 recognizes speech and generates the control command by performing keyword speech recognition and isolated word speech recognition based on the speech being transmitted from the microphone part 130 described above.

The keyword speech recognition refers to a process of detecting a predetermined keyword from speech signals continuously being input as illustrated in FIG. 8.

The keyword speech recognition is implemented by modifying the Hidden Markov Model (HMM)-based continuous speech recognition technique, and the HMM-based continuous speech recognition technique can be briefly described as follows.

When a speech signal is generated by a Markov Model (Finite State Machine that changes state every hour), a parameter of the Markov Model is estimated at a learning step. Thereafter, in the recognition part 40, a process of finding a model (phoneme or word) that is most suitable to the unknown input speech is implemented using the estimated parameter. When the model that is most suitable to the unknown input speech is found, based on that model, the recognition part 40 fuses Gaussian Mixture Model (GMM) and Deep Neural Network (DNN) with HMM, and recognizes the keyword.

According to the keyword speech recognition described above, there is an effect of performing a function that is similar to a continuous speech recognition engine with a small amount of calculation regardless of the task.

The isolated word speech recognition is a step that is implemented after the keyword speech recognition as illustrated in FIGS. 9 and 10. It refers to a process of detecting an isolated word such as a predetermined command word from a speech signal.

That is, the isolated word speech recognition refers to a process of finding a word with the maximum probability from a value measured from the speech signal. Here, the probability is determined by Priori Probability and Likelihood by the Bayesian Rule, and the Likelihood is calculated in the Hidden Markov Model (HMM).

Meanwhile, here, in the isolated word speech recognition in word units, one word constitutes one HMM, and thus there is a problem that if the number of words to be recognized increases, the size of the parameter increases in proportion to the number of words, and there is also a problem that when the word to be recognized is changed, speech data must be newly recorded and learned, which means that the speech data of all recognition target words is required.

Meanwhile, here, the phoneme unit isolated word speech recognition described above is carried out as a process of recognizing isolated words by fusing GMM and DNN with HMM. In the phoneme unit isolated word speech recognition, one phoneme constitutes one HMM, just as the word unit isolated word speech recognition, and since in the phoneme unit isolated word speech recognition, an arbitrary word can be constituted by combining phoneme models, it is possible to implement a variable vocabulary recognition engine in which the target word to be recognized changes, and even when there is a small amount of speech data, the models having the same phoneme environment can share the parameters, and thus there is an advantage that the amount of speech data can be small.

According to the recognition part 140 performing the keyword speech recognition and isolated word speech recognition as described above, a control command to be transmitted to the control part 150 that will be described later on can be easily generated based on the speech received from the microphone part 130.

Meanwhile, the recognition part 140 described above may be equipped with acoustic signal amplification function, acoustic signal filtering function, acoustic voice signal extraction function, acoustic noise signal extraction function, acoustic source separation function, acoustic echo cancellation function, acoustic noise reduction function, acoustic beam forming function and the like. According to the recognition part 140 equipped with such functions, the speech reception rate can be further improved.

The control part 150 transmits the control command transmitted from the recognition part 140 described above to a terminal 10 such that the terminal 10 can perform various functions, and transmits data to the external speaker 20 such that audio output can be implemented in the speaker 20. The control part 150 is installed in the microphone module part 120 or the case part 110, and the control part 150 may be electrically connected or wirelessly connected by Bluetooth or Wi-Fi, to the terminal 10 or the speaker 20.

The terminal 10 that received the control command transmitted from the control part 150 performs operations according to the control command. Here, the control command may be to search and play music, search and display photos, search and play videos, search and play weather information, search and play news information, search and display map information, search and display shopping information, search and display financial information, financial account inquiry, financial transfer, financial settlement and the like.

For example, in a terminal 10 such as a smart phone and the like, an exclusive application for playing music is generally installed, and thus the control command transmitted to the terminal 10 through the control part 150 may control the exclusive application described above, to search and play a music file or image file stored in a memory or SD card and the like embedded in the terminal 10, and search and display a photo file.

Meanwhile, here, the control command may be a command that controls an application that is basically or optionally installed in the terminal 10 such as a smart phone and the like, that is, service contents provided by the terminal 10, for example, Google Voice Assistant of Google, Siri of Apple, Bixby of Samsung Electronics and the like. According to such a control command, there is an effect of controlling the application or other functions and the like installed in the terminal 10 such as the smart phone, more efficiently with speech.

Further, here, the control command may be a command that controls an Internet of Things (IoT) control application or other applications installed inside an external device 40 such as a general speaker, general soundbar, AI speaker, AI soundbar, Wi-Fi speaker, Bluetooth speaker, television, set-top box, refrigerator, air cleaner/air purifier, air conditioner, washing machine/washer, microwave/microoven, smart phone, smart watch, smart glass, helmet, wearable devices for human or animal or things, Internet of Things (IoT) devices, head mounted display devices for virtual reality, earphone/earset wearable on ear, headphone/headset wearable on head, neckband/neckset/neckphone wearable on neck, wristband/wristset/wristphone wearable on wrist, notebook personal computer, tablet personal computer, desktop personal computer, electronic book (e-book), monitor, industrial robot, service robot, teaching robot, toy robot, rehabilitation robot, humanoid robot, kiosk, semiconductors manufacturing equipments and metrology equipments and inspection equipments, display panels manufacturing equipments and metrology equipments and inspection equipments, PCB boards manufacturing equipments and metrology equipments and inspection equipments, various products manufacturing equipments and metrology equipments and inspection equipments, various devices manufacturing equipments and metrology equipments and inspection equipments, automobile, train, subway, ship/boat, submarine, airplane/aircraft, drone, space shuttle/spacecraft/spaceship, space station, other electronic products, other home appliance products and the like, or a command that controls an operational function or driving function or other functions of such an external device 40. According to such a control command, there is an effect of controlling the external device 40 described above more efficiently with speech.

Further, the speaker 20 that received the control command transmitted from the control part 150 performs audio output according to the control command. Here, the control command may be to play music, search weather information, search map information and the like.

Meanwhile, the control part 150 may be connected to the terminal 10 such as a smart phone and the like wirelessly by Bluetooth; or to a general speaker through a wired port such as an auxiliary port, High-Definition Multimedia Interface (HDMI) terminal, optical connector, coaxial connector; to a Bluetooth speaker 20 through a wired port such as an auxiliary port, High-Definition Multimedia Interface (HDMI) port, optical connector, coaxial connector or wirelessly by Bluetooth; to a Wi-Fi speaker 20 through a wired port such as an auxiliary port, High-Definition Multimedia Interface (HDMI) port, optical connector, coaxial connector or wirelessly by Bluetooth; to an automobile speaker 20 through a wired port such as an auxiliary port, High-Definition Multimedia Interface (HDMI) port, optical connector, coaxial connector or wirelessly by Bluetooth or Wi-Fi.

Meanwhile, the control part 150 may directly access a server 30 in a wireless method such as Wi-Fi, hotspot, Long Term Evolution (LTE) and the like; or in a wired method such as Ethernet and the like. According to this, the control command is directly transmitted to the server 30, and the server 30 collects data based on the transmitted control command, and then generates response data based on the collected data, and then transmits the generated response data to the control part 150. The transmitted response data is output to the outside through the speaker 20, automobile speaker 20 and the like connected to the control part 150.

Further, the control part 150 may be connected to the external device 40 in a wireless method such as Wi-Fi, Bluetooth and the like; or in a wired method such as Ethernet, Universal Serial Bus (USB), Auxiliary (Aux), High-Definition Multimedia Interface (HDMI), optical connector, coaxial connector, various electronic connectors, various electronic ports/electronic terminals, various electric wires and the like, to transmit the control command to the external device 40 and control the external device 40. Such an external device 40 may be provided as, for example, a general speaker, general soundbar, AI speaker, AI soundbar, Wi-Fi speaker, Bluetooth speaker, television, set-top box, refrigerator, air cleaner/air purifier/air conditioner, washing machine/washer, microwave/microoven, smart phone, smart watch, smart glass, helmet, wearable devices for human or animal or things, Internet of Things (IoT) devices, head mounted display devices for virtual reality, earphone/earset wearable on ear, headphone/headset wearable on head, neckband/neckset/neckphone wearable on neck, wristband/wristset/wristphone wearable on wrist, notebook personal computer, tablet personal computer, desktop personal computer, electronic book (e-book), monitor, industrial robot, service robot, teaching robot, toy robot, rehabilitation robot, humanoid robot, kiosk, semiconductors manufacturing equipments and metrology equipments and inspection equipments, display panels manufacturing equipments and metrology equipments and inspection equipments, PCB boards manufacturing equipments and metrology equipments and inspection equipments, various products manufacturing equipments and metrology equipments and inspection equipments, various devices manufacturing equipments and metrology equipments and inspection equipments, automobile, train, subway, ship/boat, submarine, airplane/aircraft, drone, space shuttle/spacecraft/spaceship, space station, other electronic products, other home appliance products and the like.

Meanwhile, the control part 150 described above may be equipped with acoustic signal amplification function, acoustic signal filtering function, acoustic voice signal extraction function, acoustic noise signal extraction function, acoustic noise signal extraction function, acoustic source separation function, acoustic echo cancellation function, acoustic noise reduction function, acoustic beam forming function and the like. According to the control part 150 that is equipped with such functions, the speech reception rate can be further improved.

In a general conventional AI speaker 20 and AI soundbar 20, since the microphone that receives speech is integrated together with the speaker 20 that outputs audio, when audio is being output from the speaker 20, there occurs a problem where the speech reception rate from the microphone significantly decreases.

However, in the case of the artificial intelligence smart device 100 according to one embodiment of the present disclosure where it is separately formed apart from the speaker 20, the speech recognition rate is significantly improved, and accordingly, not only various media files and various services such as music files, audio files, music streaming services and audio streaming services that certain music providing companies provide, but also image files, video files, image streaming services, video streaming services, television streaming services and movie streaming services that certain image providing companies provide can be effectively controlled through speech.

Meanwhile, the speaker 20 may be embedded in the artificial intelligence smart device 100 according to one embodiment of the present disclosure, in which case, by the audio output of the speaker 20, the speech recognition rate may be significantly decreased, but according to the structure of the microphone module part 120 that includes the base part 121, first sealing part 122, first elasticity part 123, mesh part 124, second elasticity part 125, third elasticity part 126 and second sealing part 127, described above, the problem where sound, vibration, shock and the like carried along the microphone module part 120 and flowing into the concentration space S by the output of the speaker 20 being transmitted to the microphone part 130, causing noise, and decreasing the speech recognition rate can be effectively resolved.

Further, according to the artificial intelligence smart device 100 according to one embodiment of the present disclosure, the speech recognition rate is significantly improved according to the installation structure of the microphone part 130 and the speech recognition process of the recognition part 140, and thus even if the user who made the speech is several meters (e.g., 1 m) away, there is an effect that user's speech can be effectively recognized.

Further, according to the artificial intelligence smart device 100 according to one embodiment of the present disclosure, the terminal 10 and other external device 40 may be controlled by speech. Accordingly, it is possible to control using speech to search, display and play various media files such as music files, photo files, image files and the like stored in not only music services that certain music providing company provides but also those stored in one's terminal 10 or external device 40.

From now, referring to the attached drawings, a speech control system using the artificial intelligence smart device according to one embodiment of the present disclosure will be described in detail.

FIG. 11 is an overall illustration of a speech control system using the artificial intelligence smart device according to one embodiment of the present disclosure, FIG. 12 is an overall illustration of the speech control system using the artificial intelligence smart device according to a first modified example of the present disclosure, FIG. 13 is an overall illustration of the speech control system using the artificial intelligence smart device according to a second modified example of the present disclosure; and FIGS. 14 to 23 are overall illustrations of the speech control system using the artificial intelligence smart device according to other additional modified examples of the present disclosure.

As illustrated in FIGS. 11 to 13, a speech control system 1000 using an artificial intelligence smart device according to one embodiment of the present disclosure includes a terminal 10, a speaker 20, an artificial intelligence smart device 100, a server 30 and an external device 40.

The terminal 10 is provided as a smart phone and the like, that may be portable by a user. Such a terminal 10 is connected to the external cloud server 30, to collect and transmit information, and the terminal 10 may be wirelessly connected to the artificial intelligence smart device 100 that will be described later on, to perform various functions according to control commands, that is, to search and play music, search and display photos, search and play images, search and play weather information, search and play news information, search and display map information, search and display shopping information, search and display financial information, financial account transfer, financial settlement and the like.

The speaker 20 outputs audio such as music, speech and the like based on data transmitted from the artificial intelligence smart device that will be described later on. The speaker 20 is connected to the artificial intelligence smart device 100 in a wired or wireless method.

Such a speaker 20 receives a control command from the control part 150, and then implements audio output according to the control command, and here, the music file according to the audio output may be one transmitted from the external server 30 in a streaming method, or one that is stored in an internal storage space.

Meanwhile, here, the speaker 20 may be provided as a general speaker 20, general soundbar 20, AI speaker 20, AI soundbar 20, Wi-Fi speaker 20, Bluetooth speaker 20, speaker 20 installed in television, speaker 20 installed in set-top box, speaker 20 installed in refrigerator, speaker 20 installed in air cleaner/air purifier, speaker 20 installed in air conditioner, speaker 20 installed in washing machine/washer, speaker 20 installed in microwave/microoven, speaker 20 installed in smart phone, speaker 20 installed in smart watch, speaker 20 installed in smart glass, speaker 20 installed in helmet, speaker 20 installed in wearable devices for human or animal or things, speaker 20 installed in Internet of Things (IoT) devices, speaker 20 installed in head mounted display devices for virtual reality, speaker 20 installed in earphone/earset wearable on ear, speaker 20 installed in headphone/headset wearable on head, speaker 20 installed in neckband/neckset/neckphone wearable on neck, speaker 20 installed in wristband/wristset/wristphone wearable on wrist, speaker 20 installed in notebook personal computer, speaker 20 installed in tablet personal computer, speaker 20 installed in desktop person computer, speaker 20 installed in Electronic book (e-book), speaker 20 installed in monitor, speaker 20 installed in industrial robot, speaker 20 installed in service robot, speaker 20 installed in teaching robot, speaker 20 installed in toy robot, speaker 20 installed in rehabilitation robot, speaker 20 installed in humanoid robot, speaker 20 installed in kiosk, speaker 20 installed in semiconductors manufacturing equipments and metrology equipments and inspection equipments, speaker 20 installed in display panels manufacturing equipments and metrology equipments and inspection equipments, speaker 20 installed in PCB boards manufacturing equipments and metrology equipments and inspection equipments, speaker 20 installed in various products manufacturing equipments and metrology equipments and inspection equipments, speaker 20 installed in various devices manufacturing equipments and metrology equipments and inspection equipments, speaker 20 installed in automobile, speaker 20 installed in various transport devices other than automobile, speaker 20 installed in train, speaker 20 installed in subway, speaker 20 installed in ship/boat, speaker 20 installed in submarine, speaker 20 installed in airplane/aircraft, speaker 20 installed in drone, speaker 20 installed in space shuttle/spacecraft/spaceship, speaker 20 installed in space station, speaker 20 installed in wall in building, speaker 20 installed in ceiling, speaker 20 installed in desk, speaker 20 installed in other structures, speaker 20 installed in other electronic products, speaker 20 installed in other home appliances and the like.

The artificial intelligence smart device 100 of the present disclosure includes the case part 110, microphone module part 120, microphone part 130, recognition part 140 and control part 150, and detailed configuration thereof is identical to the configuration described in the artificial intelligence smart device 100 according to one embodiment of the present disclosure described above, and thus repeated description is omitted.

In a general conventional AI speaker 20 and AI soundbar 20, since the microphone that receives speech is integrated together with the speaker 20 that outputs audio, when audio is being output from the speaker 20, there occurs a problem where the speech reception rate from the microphone significantly decreases. However, as described above, since the speaker 20 is separately formed apart from the artificial intelligence smart device 100 of the present disclosure, the speech recognition rate is significantly improved. Therefore, according to the present disclosure, various smart devices can be effectively controlled using speech.

Meanwhile, the speaker 20 may be embedded in the artificial intelligence smart device 100 of the present disclosure, in which case, by the audio output of the speaker 20, the speech recognition rate may significantly decrease, but according to the structure of the microphone module part 120 that includes the base part 121, first sealing part 122, first elasticity part 123, mesh part 124, second elasticity part 125, third elasticity part 126 and second sealing part 127, described above, the problem where sound, vibration, shock and the like carried along the microphone module part 120 and flowing into the concentration space S by the output of the speaker 20 being transmitted to the microphone part 130, causing noise, and decreasing the speech recognition rate can be effectively resolved.

Meanwhile, the artificial intelligence smart device 100 of the present disclosure may receive input of not only speech information but also image information, as illustrated in FIG. 12, and may be provided to control the server 30, external device 40, speaker 20 and the like using the image information being input.

Further, as illustrated in FIGS. 12 to 23, the artificial intelligence smart device 100 of the present disclosure may be provided in a form being installed in the external device 40 such as a general speaker, general soundbar, AI speaker, AI soundbar, Wi-Fi speaker, Bluetooth speaker, television, set-top box, refrigerator, air cleaner/air purifier, air conditioner, washing machine/washer, microwave/microoven, smart phone, smart watch, smart glass, helmet, wearable devices for human or animal or things, Internet of Things (IoT) devices, head mounted display devices for virtual reality, earphone/earset wearable on ear, headphone/headset wearable on head, neckband/neckset/neckphone wearable on neck, wristband/wristset/wristphone wearable on wrist, notebook personal computer, tablet personal computer, desktop personal computer, electronic book (e-book), monitor, industrial robot, service robot, teaching robot, toy robot, rehabilitation robot, humanoid robot, kiosk, semiconductors manufacturing equipments and metrology equipments and inspection equipments, display panels manufacturing equipments and metrology equipments and inspection equipments, PCB boards manufacturing equipments and metrology equipments and inspection equipments, various products manufacturing equipments and metrology equipments and inspection equipments, various devices manufacturing equipments and metrology equipments and inspection equipments, automobile, train, subway, ship/boat, submarine, airplane/aircraft, drone, space shuttle/spacecraft/spaceship, space station, other electronic products, other home appliance products and the like.

The server 30 is for receiving data from the control part 150, or transmitting data to the control part 150. The server 30 receives the control command being transmitted from the control part 150 to collect information, and forms response data based on the collected information, and transmits the response data formed to the control part 150. Here, the response data may be music information, image information, news information, weather information, map information and the like.

The external device 40 is for receiving data from the control part 150, or transmitting data to the control part 150, to perform various functions. As illustrated in FIGS. 11 to 22, the external device 40 may be provided as a general speaker, general soundbar, AI speaker, AI soundbar, Wi-Fi speaker, Bluetooth speaker, television, set-top box, refrigerator, air cleaner/air purifier, air conditioner, washing machine/washer, microwave/microoven, smart phone, smart watch, smart glass, helmet, wearable devices for human or animal or things, Internet of Things (IoT) devices, head mounted display devices for virtual reality, earphone/earset wearable on ear, headphone/headset wearable on head, neckband/neckset/neckphone wearable on neck, wristband/wristset/wristphone wearable on wrist, notebook personal computer, tablet personal computer, desktop personal computer, electronic book (e-book), monitor, industrial robot, service robot, teaching robot, toy robot, rehabilitation robot, humanoid robot, kiosk, semiconductors manufacturing equipments and metrology equipments and inspection equipments, display panels manufacturing equipments and metrology equipments and inspection equipments, PCB boards manufacturing equipments and metrology equipments and inspection equipments, various products manufacturing equipments and metrology equipments and inspection equipments, various devices manufacturing equipments and metrology equipments and inspection equipments, automobile, train, subway, ship/boat, submarine, airplane/aircraft, drone, space shuttle/spacecraft/spaceship, space station, other electronic products, other home appliance products and the like. Such an external device 40 performs functions such as providing various services, transmitting information, implementing games and the like based on the control command transmitted from the control part 150.

According to the speech control system 1000 using the artificial intelligence smart device according to one embodiment of the present disclosure that includes the terminal 10, speaker 20, artificial intelligence smart device 100, server 30 and external device 40, as described above, the speech recognition rate is significantly improved, and thus various smart devices can be effectively controlled according to speech.

Further, according to the speech control system 1000 using the artificial intelligence smart device according to one embodiment of the present disclosure, it is possible to easily control various external devices 40 with speech, and thus by applying the present disclosure, various services such as services for controlling various operations of external devices with speech, services for searching, displaying and playing various information (speech information, text information, photo information, image information and the like), speech chatbot service, game and play services, advertisement provision services, and the like may be effectively provided to the user.

In the above, even though it has been described that all components constituting the embodiment of the present disclosure are combined or operated in combination, the present disclosure is not necessarily limited to that embodiment. That is, as long as it is within the scope of the present disclosure, one or more of all the components may be selectively combined and operate.

Further, terms such as "comprises", "constitutes" or "have" described above, unless otherwise stated, mean that the corresponding component may be inherent, so it should be construed as being able to further include other components rather than excluding other components. All terms, including technical or scientific terms, have the same meaning as commonly understood by one of ordinary skill in the art to which the present disclosure belongs, unless otherwise defined. Terms commonly used, such as those defined in the dictionary, should be construed as being consistent with the contextual meaning of the related art, and should not be construed in an ideal or excessively formal sense unless explicitly defined in the present disclosure.

In addition, the above description is merely illustrative of the technical idea of the present disclosure, and those of ordinary skill in the art to which the present disclosure pertains may make various modifications and variations without departing from the essential characteristics of the present disclosure.

Therefore, the embodiments disclosed in the present disclosure are not intended to limit the technical spirit of the present disclosure, but to explain, and the scope of the technical spirit of the present disclosure is not limited by those embodiments. The protection scope of the present disclosure should be construed by the following claims set, and all technical ideas within the scope equivalent thereto should be construed as being included in the scope of the present disclosure.

What is claimed is:

1. An artificial intelligence smart device comprising:
   a case part;
   a microphone module part installed in the case part;
   a microphone part installed in the microphone module part, and receives speech from outside;
   a recognition part installed in the case part, and recognizes the speech received in the microphone part to generate a control command; and
   a control part installed in the case part, and transmits the control command to a terminal such that the terminal can operate, and transmits data to a speaker such that audio output can be performed in the speaker,
   wherein the microphone module part forms a concentration space that is a space where speech is to be concentrated, and the microphone part is installed on the concentration space to prevent the audio output that is output from the speaker from being transmitted to the microphone part,
   wherein the microphone module part comprises a base part where the concentration space is formed, and an elasticity part made of an elastic material or acoustic absorbent material or vibration proof material or composite material to prevent sound or vibration or shock caused in the speaker from being transmitted to the microphone part, and installed at a concentration space side and a first sealing part that finishes an upper surface of the concentration space, and a mesh part that is made of a mesh material and installed on one or more of an upper side or lower side of the concentration space.

2. The artificial intelligence smart device according to claim 1,
wherein the elasticity part comprises a first elasticity part installed on the upper side of the concentration space and fixated on the base part by the first sealing part, a second elasticity part installed on an upper side of the microphone part, and a third elasticity part installed on a lower surface of the concentration space and installed on the microphone module part such that the second elasticity part and the microphone part can be accommodated.

3. The artificial intelligence smart device according to claim 2,
wherein the microphone module part further comprises a second sealing part installed on a lower side of the microphone module part to fixate the third elasticity part to the microphone module part.

\* \* \* \* \*